United States Patent [19]
Chiu

[11] Patent Number: 5,873,192
[45] Date of Patent: Feb. 23, 1999

[54] FISHING KIT

[76] Inventor: Chun-Mu Chiu, Fl., 1, No. 304, Wu Fen N. Rd., Chia Yi City, Taiwan

[21] Appl. No.: 810,183

[22] Filed: Feb. 3, 1997

[51] Int. Cl.⁶ .................................................. A01K 97/00
[52] U.S. Cl. ...................... 43/54.1; 43/21.2; 297/188.08
[58] Field of Search .................................... 43/21.2, 54.1, 43/57.1; 248/516; 297/188.08, 188.1; 312/235.5, 266

[56] References Cited

U.S. PATENT DOCUMENTS

| | | | |
|---|---|---|---|
| 3,128,137 | 4/1964 | Dokter | 297/188.08 |
| 3,230,006 | 1/1966 | Sokolis | 297/188.1 |
| 3,304,035 | 2/1967 | Davis | 248/516 |
| 4,271,624 | 6/1981 | Peluso | 43/54.1 |
| 4,353,182 | 10/1982 | Junkass | 43/54.1 |
| 4,645,167 | 2/1987 | Hardwick | 43/21.2 |
| 4,890,414 | 1/1990 | Bridenthal | 43/54.1 |
| 5,063,701 | 11/1991 | Ottens | 43/21.2 |
| 5,100,198 | 3/1992 | Baltzell | 43/54.1 |
| 5,471,779 | 12/1995 | Downey | 43/54.1 |
| 5,586,804 | 12/1996 | Burroughs | 297/188.08 |
| 5,692,334 | 12/1997 | Magnuson | 43/54.1 |

*Primary Examiner*—Kurt Rowan
*Attorney, Agent, or Firm*—David and Raymod; Raymond Y. Chan

[57] ABSTRACT

A composite fishing kit includes a partitioned tray for holding various fishing tackles and tools, a foldable chair which can be adjusted to different heights and has an adjustable bar engageable with an umbrella and a storing bag for holding the tray and the folded chair therein. The tray further has rod support racks for holding the fishing rods. A fisherman can rest on the chair under the umbrella while fishing. The kit may be packed in a small size to facilitate carrying or storage.

3 Claims, 7 Drawing Sheets

FISHING KIT

BACKGROUND OF THE INVENTION

1. Field of the Invention

This invention relates to a composite fishing kit and particularly to a multifunction fishing kit which is versatile and compact in size.

2. Description of the Prior Art

Fishing is a very popular outdoors leisure activity. To fully enjoy this activity, a fisherman usually has to prepare and equip a lot of things, e.g. fishing gears, hook, bait, chair, umbrella, hand tools, etc. These things have different sizes and shapes. They need to be packed together for carrying and need to be unpacked and arranged for use. It is a rather burdensome chore. Doing it not properly or carefully could easily spoil the fun of fishing.

SUMMERY OF THE INVENTION

In view of aforesaid problem, it is therefore an object of this invention to provide a composite fishing kit which can contain a lot of different finishing gears and tools neatly. A fisherman can take whatever he needs easily and readily. The kit can also be packed in a small size to facilitate carrying, transportation and storage.

It is another object of this invention to provide a fishing kit which includes a rod support means and an umbrella support means to enable a fisherman relaxing conformably while fishing. It also gives the fisherman a shelter from sun shine or rain drops.

It is a further object of this invention to provide a fishing kit which includes a compact resting means which enables a fisherman to take a rest when desired.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
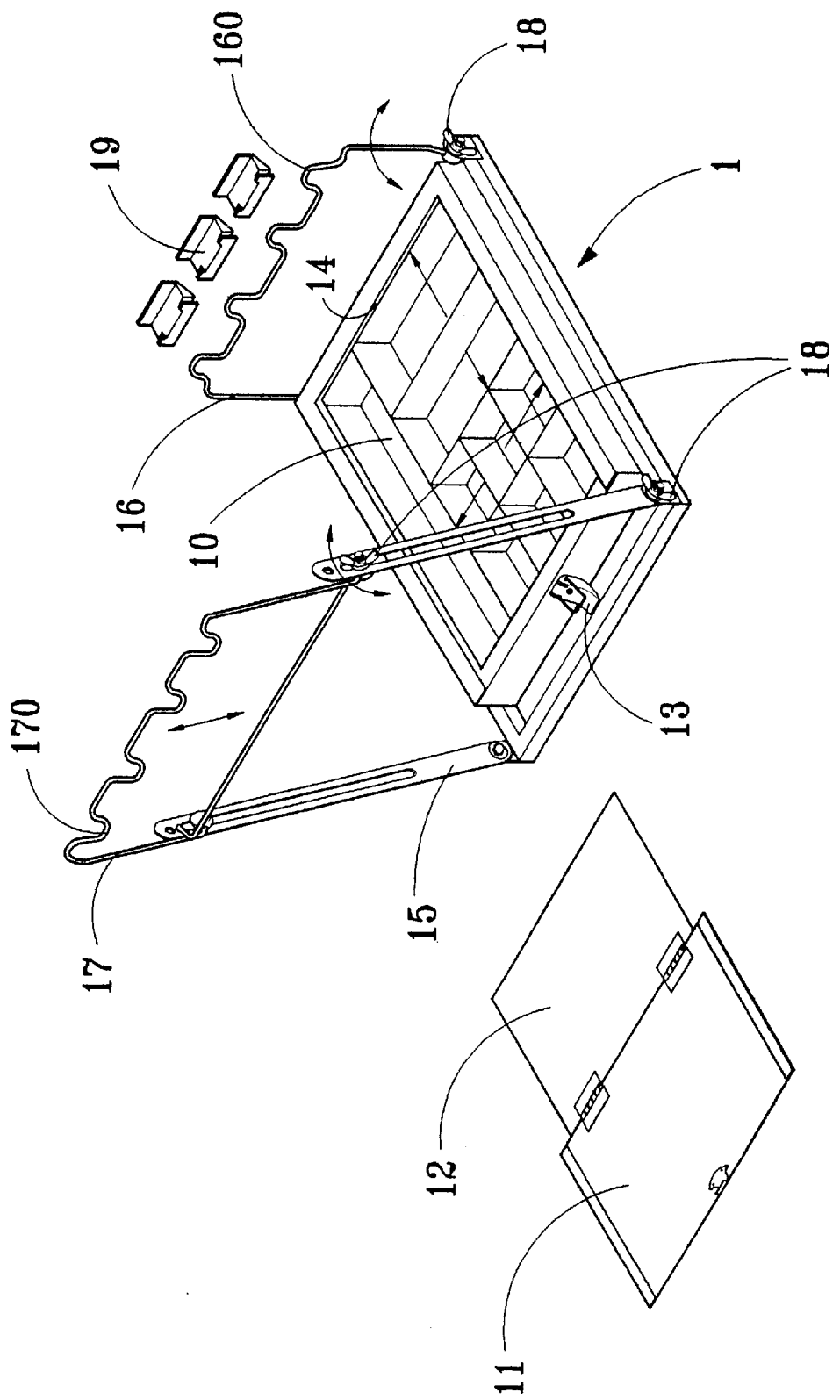
FIG. 1 is an exploded view of this invention.
Figure 2:
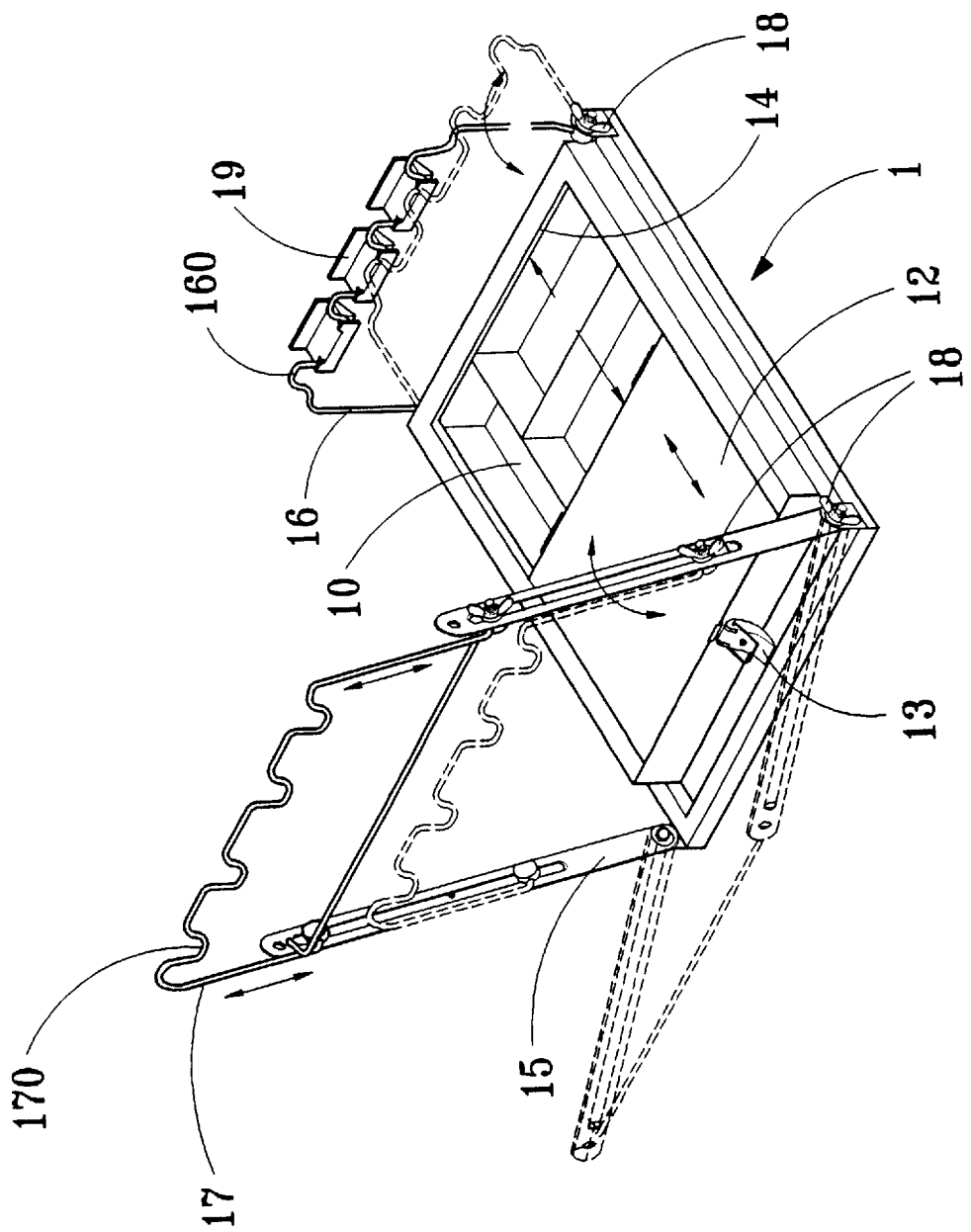
FIG. 2 is a perspective view of this invention.

Referring to FIGS. 1 and 2, a fishing kit 1 of this invention includes a partitioned tray 10 which consists of a plural number of separate spaces to contain different types of fishing takes and tools. Above the tray 10, there is a movable cover 11 which is hinged with a movable lid 12. The tray 10 has a latch 13 at one end and a slot 14 at another end. The lid 12 may be wedged into the slot 14 and the cover 11 may engage with the latch 13 to form a fully covered container to keep all the fishing tackles and tools inside for carrying or storage . When in use, the lid 12 may be raised over the cover 11. Then by moving the cover 11 to and fro, the tackles and tools in the partitioned tray 10 may be taken out easily. At one end of the tray 10, there also are a pair of spaced front racks 15 each of which has a center slot and a butterfly nut 18 engagable with a first rod rack 17. The first rod rack 17 has a plural number of beat slots 170 to enable fishing rods to rest therein. The butterfly nut 18 may be adjusted to make the first rod rack 17 moving up or down, or tilting at a desired angle.

At another end of the tray 10, there is a second rod rack 16 which also has a plural number of beat slots 160 for supporting fishing rod therein. Another butterfly nut 18 is disposed at one end of the second rod rack 16 to enable it to tilt at an angle desired. The second rod rack 16 can also engage with a plural number of retaining blocks 19 which can hold and secure one end of the fishing rods. By means of such structure, the fishing rods can be held secretly by this invention while the fisherman's hands can be freed for rest or doing other things. The retaining blocks if are movable and can be removed when not is use.

Figure 3:
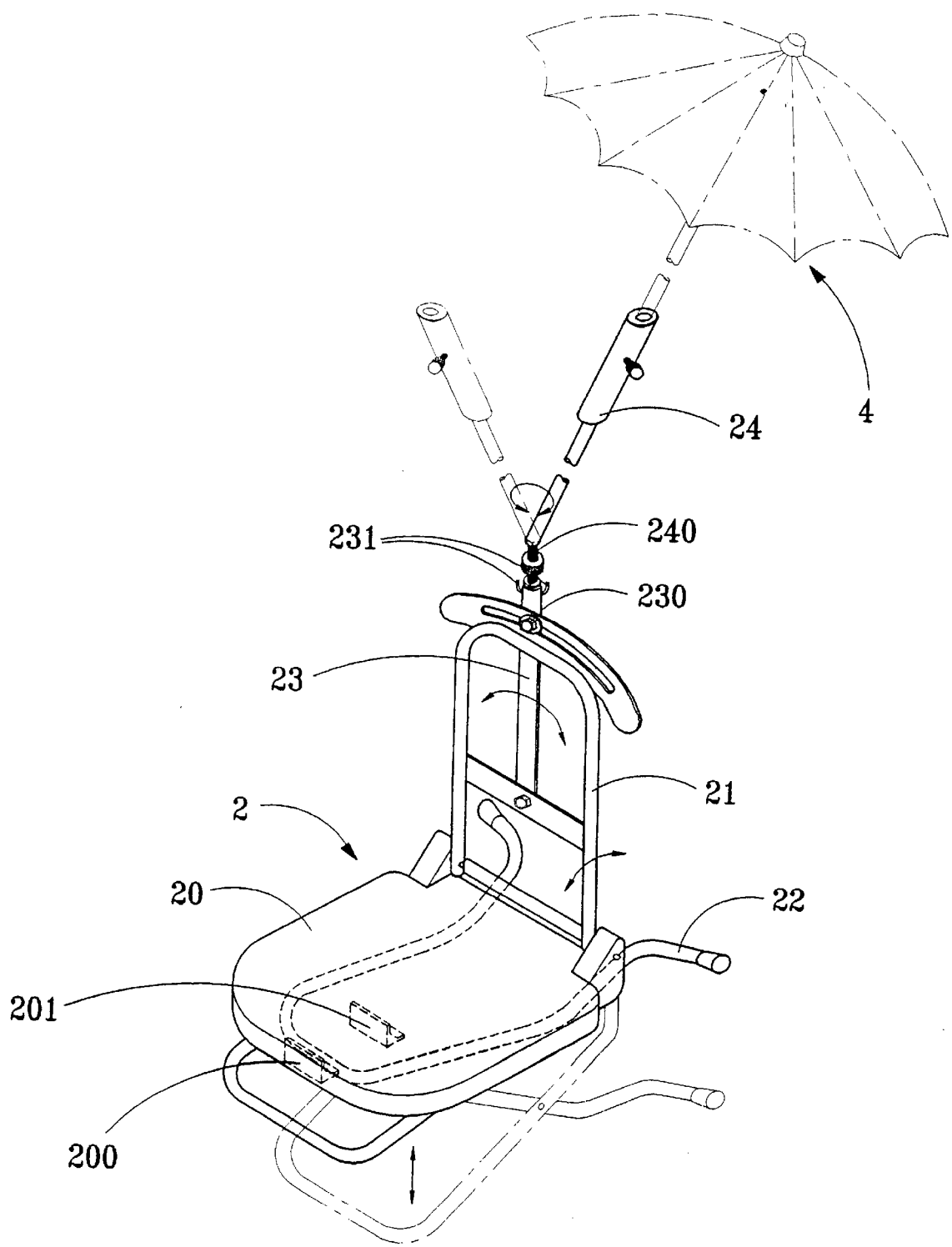
FIG. 3 is a perspective view of a foldable chair of this invention.

Referring to FIG. 3, a foldable chair 2 of this invention includes a seat 20 and a seat back 21. A leg 22 is located below the seat 20. The leg 22 may be engaged with a front supporting block 200 for a low position, or may be engaged with a rear supporting block 201, for a high position.

On the seat back 21 , there is an adjustable bar 23 which may be moved left or right by means of an adjusting nut 230. There are hooks 231 located at one end of the adjusting bar 23 for hanging water bottle or other articles. The adjusting bar 23 can also support a connector 240 which is engagable with a tube 24 for holding an umbrella 4. The connector 240 may be tilted at any angle desired. Therefore the fisherman may seat on the chair 2 under the umbrella 4, and thus be sheltered from sun shine or rain fall.

Figure 4:
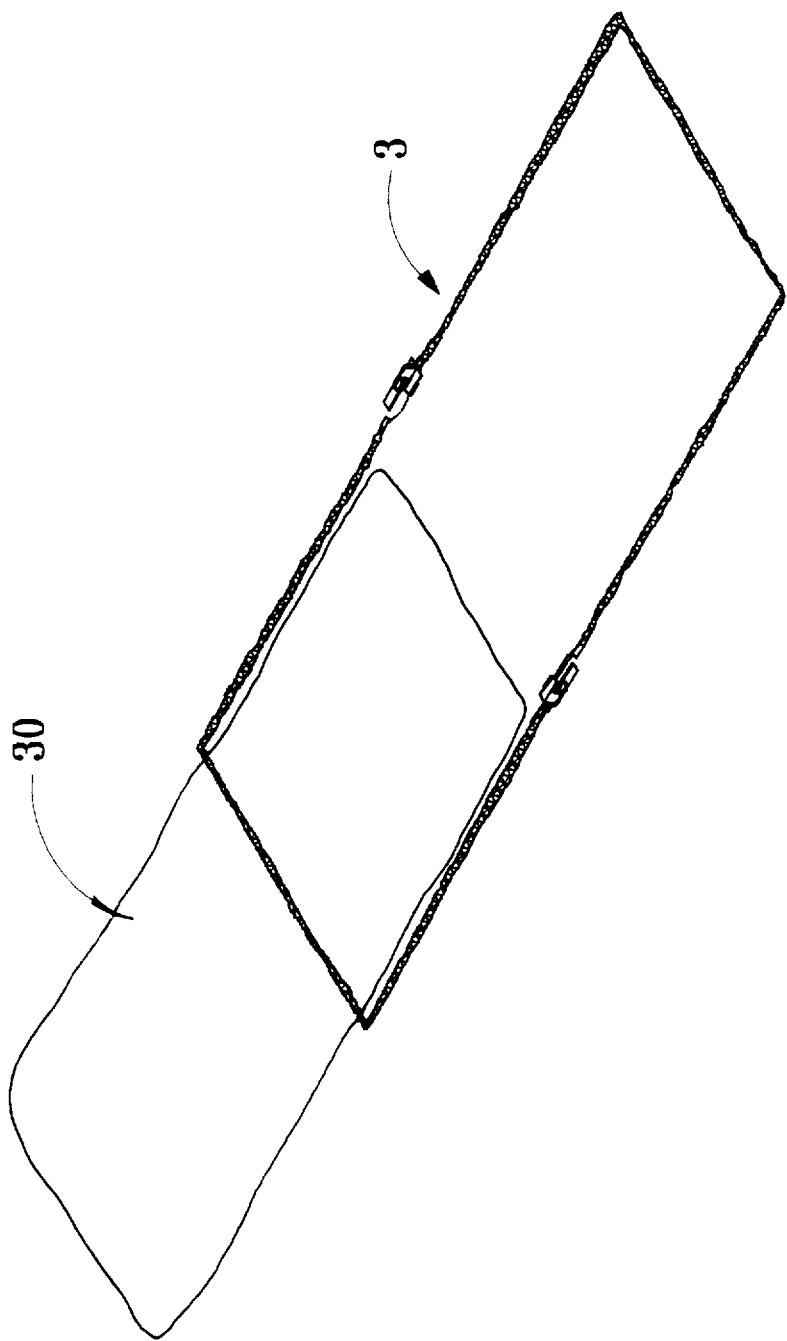
FIG. 4 is an extended view of a storing bag of this invention.
Figure 5:
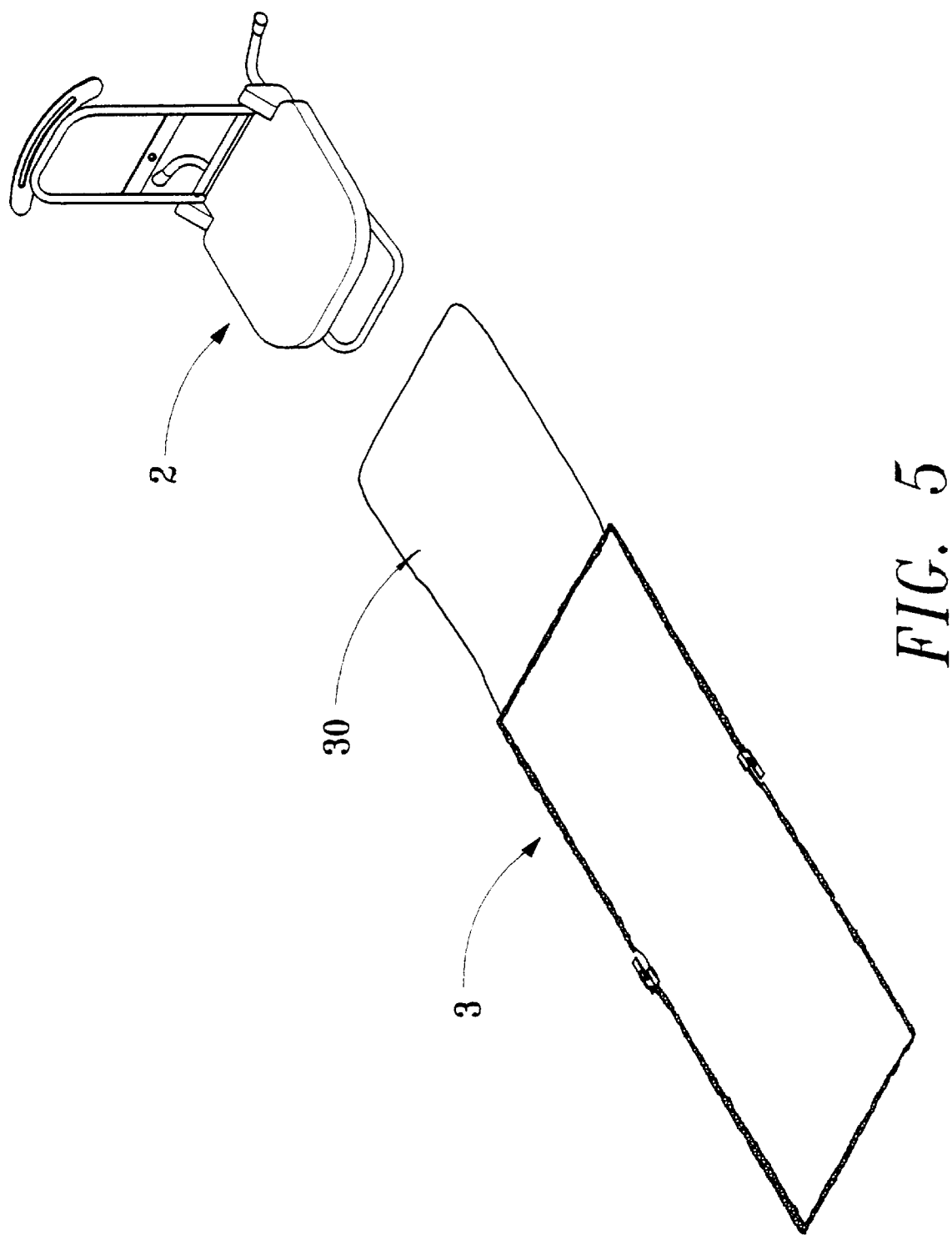
FIG. 5 is a perspective view of a resting means of this invention.

FIG. 4 shows a storing bag 3 for holding the fishing kit 1, the chair 2 and the tube 24. It has an entension 30. When the storing bag 3 is spreaded on the floor and being extended, it become s a mattress allowing the fisherman to lie thereon while the chair 2 may be served as a pillow. (shown in FIG. 5)

Figure 6:
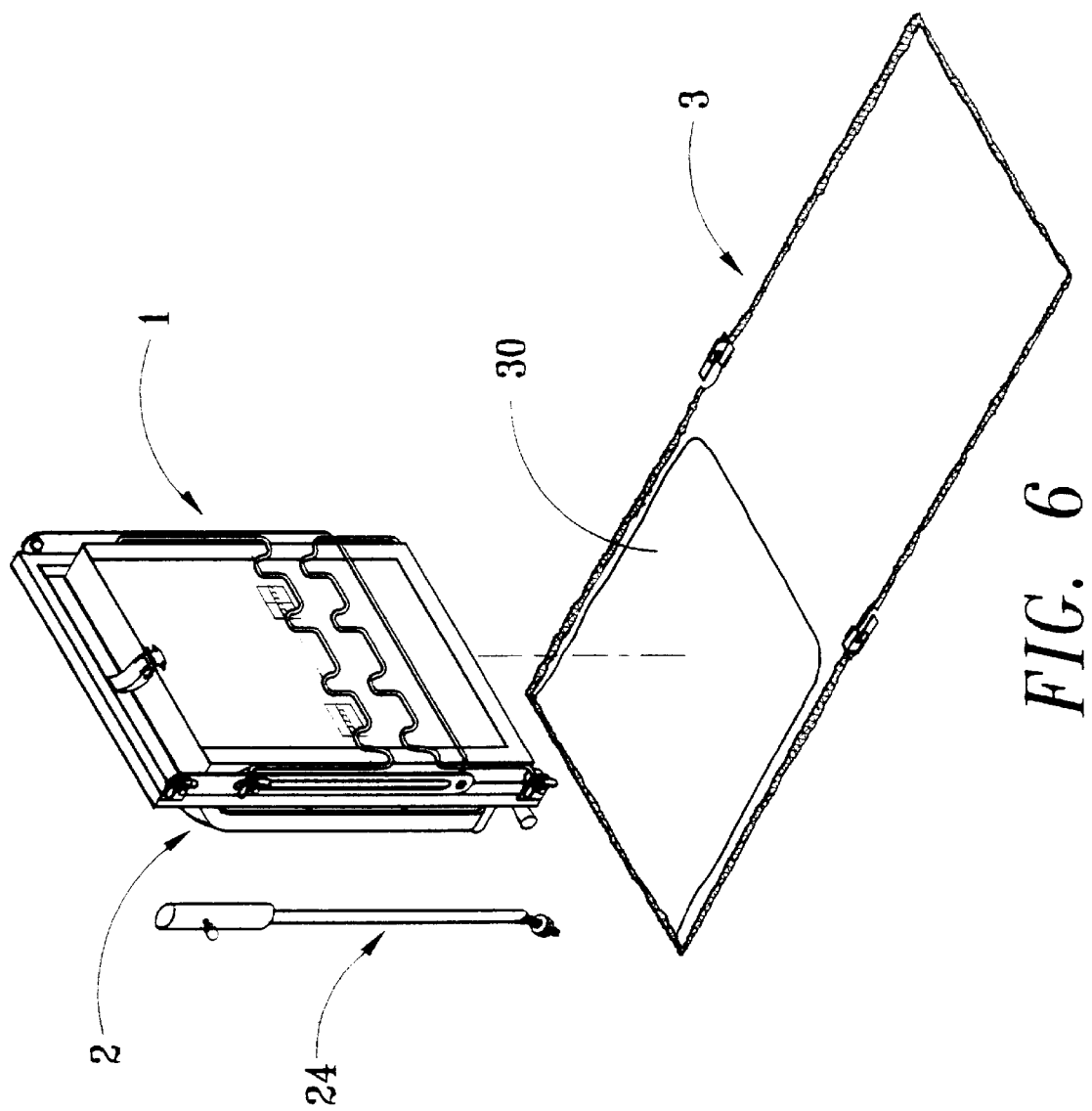
FIG. 6 is perspective view of a storing bag, in folding state.
Figure 7:
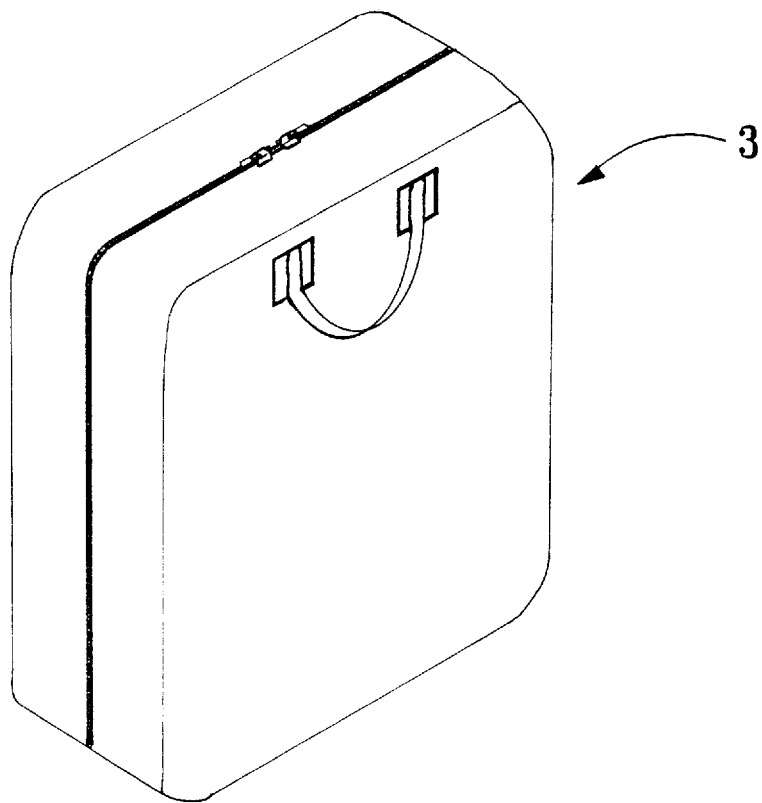
FIG. 7 is a pictorial view of this invention after packing in a storing bag.

Referring to FIGS. 6 and 7, when the fishing kit 1 and the chair 2 are folded and packed, they may be contained within the storing bag 3 in a compact size. It is easy to carry and store.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A fishing kit, comprising:

a partitioned tray having a plural number of separate spaces for containing fishing tackles and tools, and further including a movable cover hinged at one end thereof with a movable lid for covering said partitioned tray, a pair of spaced front racks connected to one end of said partitioned tray engagable with a first rod rack, and a second rod rack connected to another end of said partitioned tray, wherein said movable cover is engaged with a latch located at one end of said partitioned tray, and that said first rod rack is movable up or down or tiltable at a desired angle by means of an adjustable nut located on the front racks, and that said first rod rack and said second rod rack have respectively a plural number of rod supporting slots formed thereon;

a foldable chair including a seat, a leg located below said seat and a seat back connected to one end of said seat, said seat including at least a front supporting block and a rear supporting block affixed thereunder for selectively engaging with said leg, wherein when said leg is engaged with said front supporting block, said seat is supported in a low position, however when said leg is engaged with said rear supporting block, said seat is supported in a high position, said seat back having an adjustable bar movable sideways, said adjustable bar having one end engaged with a connector to engage with a tube for holding an umbrella tiltable at various angles; and a storing bag having an extension for holding said partitioned tray with said movable cover, said foldable chair, and said tube therein.

2. The fishing kit as recited in claim 1 further comprising a retaining block engaged with said second rod rack for holding one end of a fishing rod.

3. The fishing kit as recited in claim 1 wherein said adjustable bar further has a hook located thereon for hanging fisherman's articles.

* * * * *